Figure 2:
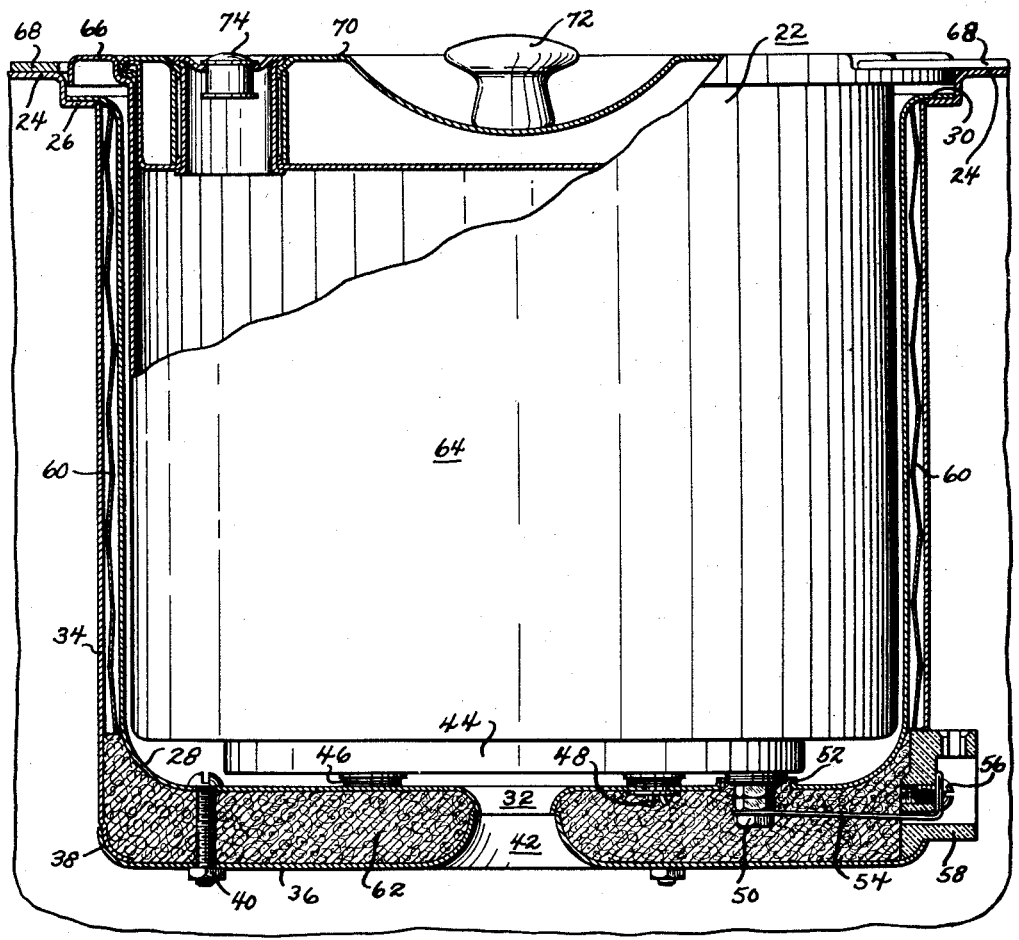

Oct. 15, 1940.   F. H. McCORMICK   2,217,804
DOMESTIC APPLIANCE
Filed Jan. 28, 1939

INVENTOR.
Francis H. McCormick
BY Spencer Hardman and Fehr
ATTORNEYS

Patented Oct. 15, 1940

2,217,804

UNITED STATES PATENT OFFICE 2,217,804

DOMESTIC APPLIANCE

Francis H. McCormick, Dayton, Ohio, assignor to General Motors Corporation, Dayton, Ohio, a corporation of Delaware Application January 28, 1939, Serial No. 253,397

11 Claims. (Cl. 219—35)

This invention relates to a domestic appliance and more particularly to electric deep well cookers for electric ranges and the like.

It is an object of my invention to provide an efficient deep well type of electric cooker in which the heat loss is minimized and in which direct conduction is provided between the heating element and the container to be heated and poor heat conduction is provided between the heating element and the walls of the well.

It is another object of my invention to provide an electric deep well cooker having provision for taking care of any spillage and constructed so as to avoid fouling of the heating element or electric connections under such circumstances.

It is another object of my invention to provide a deep well cooker which is constructed in such a manner that its parts may be easily manufactured and assembled.

It is still another object of my invention to provide a deep well cooker which may be easily cleaned and maintained.

Further objects and advantages of the present invention will be apparent from the following description, reference being had to the accompanying drawing, wherein a preferred form of the present invention is clearly shown.

Figure 1:
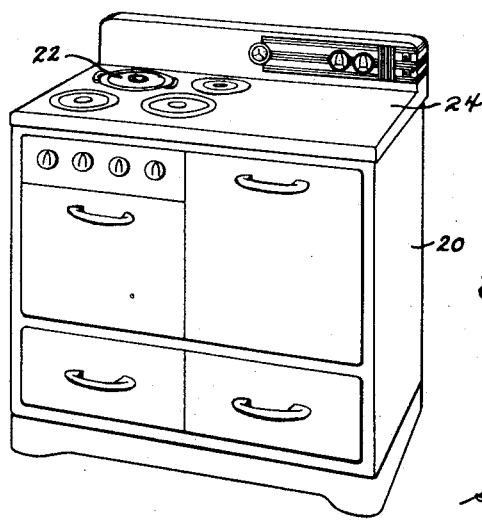

In the drawing:

Fig. 1 is a perspective view of an electric range incorporating a deep well cooker embodying my invention; and Fig. 2 is a sectional view of the deep well cooker shown in Fig. 1.

Briefly, I have shown a deep well cooker in which a disk-shaped heating element is held in the inner shell space up from the bottom thereof by a plurality of spacers, the number of which may be adjusted to adjust the position of the heating element so that it will directly support the container and thereby secure good heat conduction therewith. The well is made of an inner cup-shaped shell surrounded by a sleeve and a bottom member which are fastened together by bolts. The inner shell and the bottom member are provided with telescoping flanged apertures for a drain. The terminals of the heating element extend through the upwardly flanged apertures in the bottom of the inner shell and are connected by flat bar conductors to a porcelain block held between the bottom member and the sleeve.

Referring now to the drawing and more particularly to Fig. 1, there is shown an electric range 20 provided with a deep well electric cooker 22 in the cooking top 24 of the range. The cooking top 24 is provided with a flanged opening 26 which receives the deep well cooker. The deep well cooker is formed of an inner cup-shaped metal shell 28 having an outwardly turned rim 30 adapted to rest upon the recessed flange surrounding the aperture 26 of the cooking top 24 in order to support the cooker. The inner shell 28 is provided with a substantial flat bottom with rounded corners for ease of cleaning. At its center portion, the inner shell is provided with an aperture 32 having a downwardly turned flange of relatively large radius. This downwardly turned flange 32 serves as a drain for the inner shell.

The side walls of the inner shell 28 are surrounded by a sleeve 34 having its upper end clamped against the flange 30 of the inner shell 28 by a bottom member 36. This bottom member 36 has rounded edges 38 which fit tightly against the rounded lower edges of the sleeve 34 which are shaped so as to fit the rounded edges 38. The inner shell 28 is connected to the bottom member 36 by the nuts and bolts 40 which hold the shell assembly together by holding the bottom member 36 tightly in engagement with the lower edge of the the sleeve 34, while the upper edge of the sleeve 34 is held against the rim 30 of the inner shell 28.

The bottom member 36 is provided with the flanged aperture 42 which has a flange of relatively large radius turned upwardly so as to receive the lower edge of the downwardly turned flanged aperture 32 so as to provide a drain opening in the bottom of the well having rounded edges. The downwardly flanged aperture 32 overlaps the upper edge of the flanged aperture 42 so that no liquid will run into the insulation space between these shells.

A disk-shaped metal-clad electric heating element 44 is provided directly above the bottom of the inner shell 28 and is held spaced away from the bottom 28 by three or more washers 46 which surround the split rivets 48 extending downwardly at four symmetrically located points of the heating element 44. These split rivets extend downwardly through an opening in the bottom shell and pass through the washer upon the bottom-side of the bottom shell, and their ends are split so as to hold the bottom washer tightly against the bottom of the inner shell to firmly hold the heating element 44 in place. The heating element 44 is preferably provided at one side with three or more downwardly extending terminals 50 which extend downwardly through apertures 52 which are flanged upwardly from the bottom of the inner shell 28 so as to prevent liquids from flowing through these apertures into the insulation space.

The terminals 50 are provided with nuts in order to connect the flat bar type of the electric conductors 54 with the binding screws 56 provided in the porcelain electrical insulating block 58, which is molded in such a fashion that it may be readily held between a cut-out portion of the sleeve 34 and the rounded edge 38 of the bottom member 36.

In order to conserve space, it is desirable that the side walls of the shell construction be relatively thin, since the heat loss through the side wall is comparatively small. This makes the inner and outer shells rather close together and makes it difficult to use ordinary insulation in this space. In order to make the assembly of the cooker more easy, I provide insulation in the form of one or more sheets of aluminum foil 60 which is loosely wrapped around the side walls of the inner shell 28 prior to its assembly with the sleeve and the bottom member 36. In the insulation space at the bottom, however, I provide a wool type of insulation such as glass wool or mineral wool designated by the reference character 62. This insulation is held firmly in place between the bottom of the inner shell 28 and the bottom member 36. Since this insulation is also a good electrical insulator, it is unnecessary that the electrical conductors 54 be insulated.

The deep well cooker is provided with a flat bottom container 64 having its bottom resting directly upon the heating element 44 so as to provide direct conduction from the heater to the container so that the heat output of the heating element 44 may be used with the greatest of efficiency. The spacing of the heating element 44 from the bottom of the container by the spacing washers 46 also improves the efficiency, since it prevents the heat of the heating element from being directly applied in any large quantity to any other part excepting the container 64. The spacing of the heating element away from the bottom keeps the element above liquids spilled therein which are readily removed through the drain.

The container 64 is provided with a flanged rim 66 and a pair of fold-down handles 68 for easy removal of the container. The spacing washers 46 beneath the heating element 44 should be so adjusted in number that the rim 66 of the container 64 is held about $\frac{3}{32}$ inch above the flange 30 of the inner shell 28 when the container 64 rests directly upon the heating element 44. The flanged aperture 26 should have a deep enough flange so that under the circumstances the bottom of the rim 66 is below the face of the cooking top 24. This will prevent the escape of hot air from the well. The container 64 is provided with a sheet metal cover 70 having hollow walls enclosing a dead air space for insulating purposes. The cover 70 is also provided with a recessed plastic knob 72 and a steam vent 74. Thus, by this construction, simplicity and efficiency are provided.

While the form of embodiment of the invention as herein disclosed constitutes a preferred form, it is to be understood that other forms may be adopted, all coming within the scope of the claims which follow.

What is claimed is as follows:

1. An electric cooking device comprising an inner cup-shaped shell, an outer casing surrounding the inner shell, a heating element within the shell, a plurality of spacing washers at a plurality of points between said heating element and said shell, and fastening means extending through the spacing washers for fastening the heating element to the shell.

2. An electric cooking device comprising an inner cup-shaped shell, an outer casing surrounding the inner shell, a heating element within the shell, adjustable means for spacing the heating element up from the bottom of the shell, and means for fastening the heating element to the shell.

3. An electric cooking device comprising an inner cup-shaped shell, an outer casing surrounding the inner shell, a heating element within the shell, adjustable means for spacing the heating element up from the bottom of the shell, and means for fastening the heating element to the shell, said shell being provided with a drain aperture in its bottom portion.

4. An electric cooking device comprising an inner cup-shaped shell, an outer casing surrounding the inner shell, a heating element within the shell, a receptacle positioned upon the heating element having its rim overlying the rim of the shell, and adjustable spacing means for spacing the heating element above the bottom of the shell for holding said heating element in position to support said receptacle with its rim above the rim of said shell.

5. An electric cooking device comprising, a cup-shaped inner metal shell, an outer sleeve surrounding said inner shell, said cup-shaped inner shell having a rim portion overlying the upper rim of said sleeve, a bottom member having its rim interfitting with the lower rim of said sleeve, said inner shell being provided with an aperture having a downwardly turned flange in its bottom, said bottom member having an aperture registering with said aperture in said shell, said downwardly turned flange extending below the edges of said aperture in said bottom member.

6. An electric cooking device comprising, a cup-shaped inner metal shell, an outer sleeve surrounding said inner shell, said cup-shaped inner shell having a rim portion overlying the upper rim of said sleeve, a bottom member having its rim interfitting with the lower rim of said sleeve, and fastening means for drawing the bottom of said inner shell and said bottom member together, and an electrical insulating block held between said sleeve and said bottom member.

7. An electric cooking device comprising, a cup-shaped inner metal shell, an outer sleeve surrounding said inner shell, said cup-shaped inner shell having a rim portion overlying the upper rim of said sleeve, a bottom member having its rim interfitting with the lower rim of said sleeve, and fastening means for drawing the bottom of said inner shell and said bottom member together, an electrical insulating block held between said sleeve and said bottom member, an electric heating element within said inner shell, said inner shell having an aperture with an upwardly turned flange therein, said electric heating element having a terminal extending downwardly through said aperture, and an electrical conductor connecting said terminal to said insulating block.

8. An electric cooking device comprising, a cup-shaped inner shell means, a cup-shaped outer shell means, an electric heating element within the inner shell means, means for spacing the heating element up from the bottom of the inner shell means and for fastening the heating element to the bottom of the inner shell means, and drain means provided in the bottoms of the shell means beneath the heating element.

9. An electric cooking device comprising, a cup-shaped inner shell means, a cup-shaped outer shell means surrounding the inner shell means, an electric heating element within said inner shell means, said inner shell means having an aperture with an upwardly turned flange, said electric heating element having a terminal extending downwardly through said aperture, and an electrical conductor extending between said inner and outer shell means connected to the lower portion of said terminal.

10. An electric cooking device comprising, a cup-shaped inner shell means, a cup-shaped outer shell means, surrounding the inner shell means, an electric heating element within said inner shell means, said inner shell means having an aperture with an upwardly turned flange, said electric heating element having a terminal extending downwardly through said aperture, said outer shell means being provided with an opening, a terminal block for closing said opening, and an electrical conductor connecting the lower end of said terminal and the terminal block.

11. An electric cooking device comprising, a cup-shaped inner shell means, a cup-shaped outer shell means surrounding the inner shell means, an electric heating element within said inner shell means, said inner shell means having an aperture with a downwardly turned flange in its bottom, said outer shell means having an aperture registering with said aperture in said inner shell means, said downwardly turned flange extending below the edges of the aperture in the outer shell means.

FRANCIS H. McCORMICK.